May 5, 1953

C. WITTENMYER 2,637,493

AUTOMATIC PRINTING APPARATUS FOR CALCULATING MACHINES

Filed Aug. 29, 1950

INVENTOR.
Carlos Wittenmyer
BY
Wood, Arey, Herron & Evans
ATTORNEYS.

May 5, 1953 C. WITTENMYER 2,637,493
AUTOMATIC PRINTING APPARATUS FOR CALCULATING MACHINES
Filed Aug. 29, 1950 7 Sheets-Sheet 2
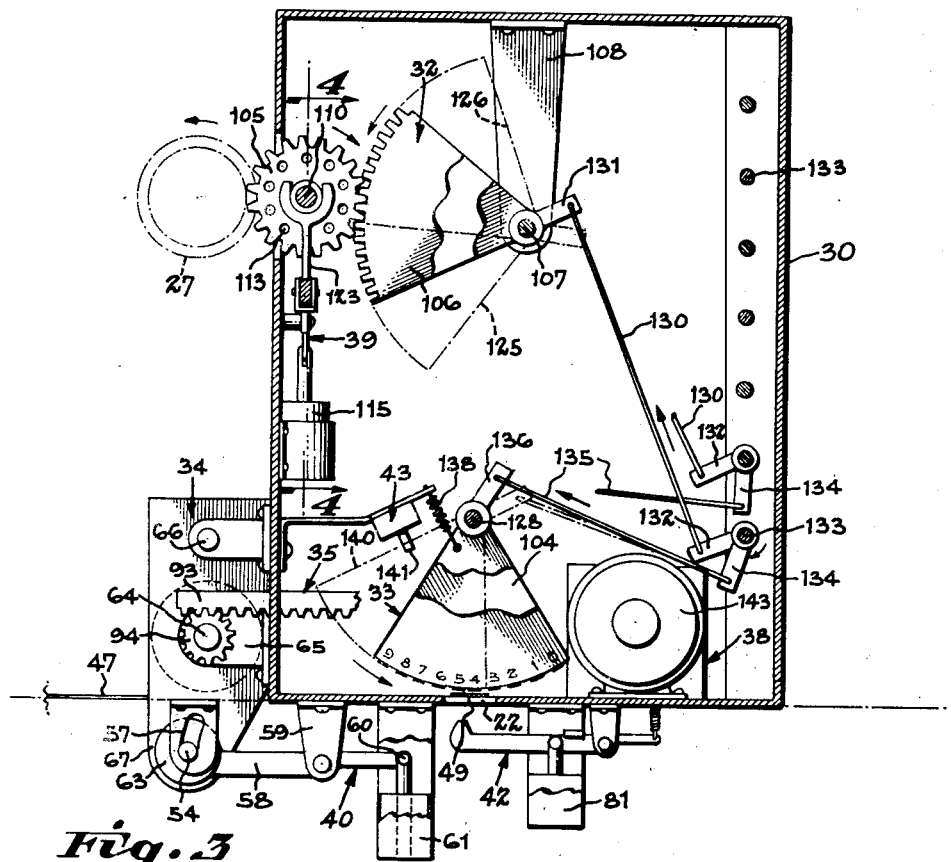
Fig. 3
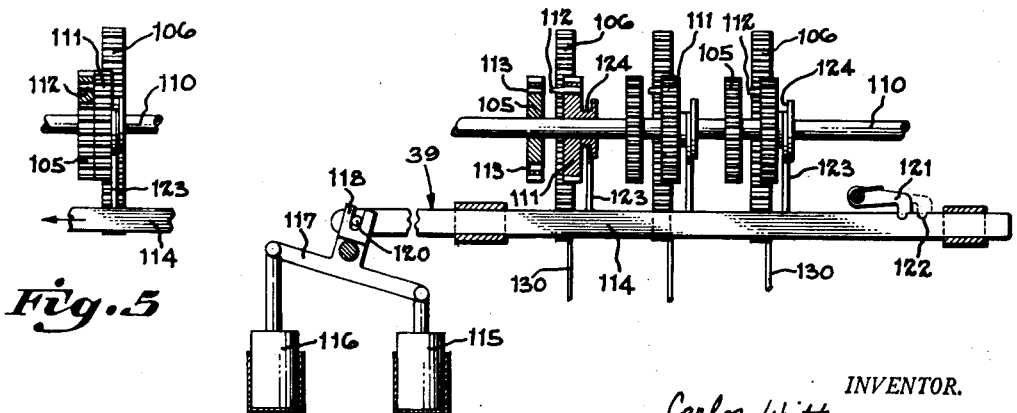
Fig. 5
Fig. 4
INVENTOR.
Carlos Wittenmyer
BY
Wood, Arey, Herron & Evans
ATTORNEYS.

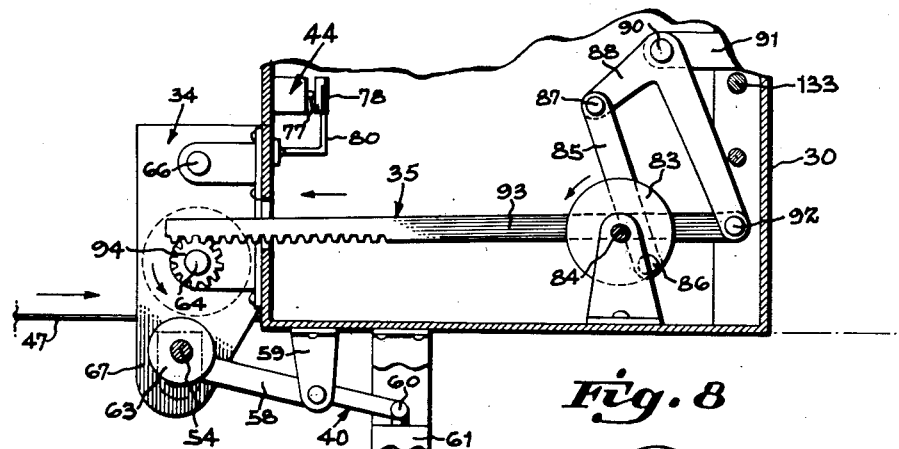
Fig. 8
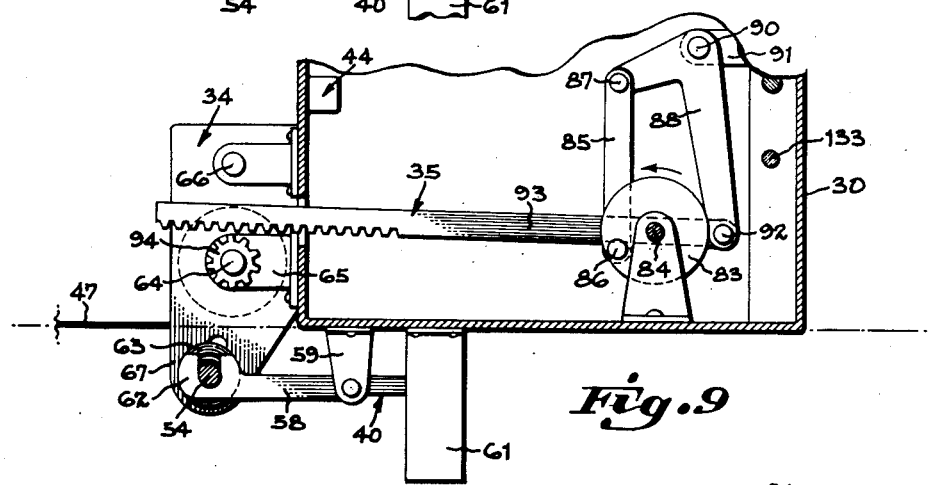
Fig. 9
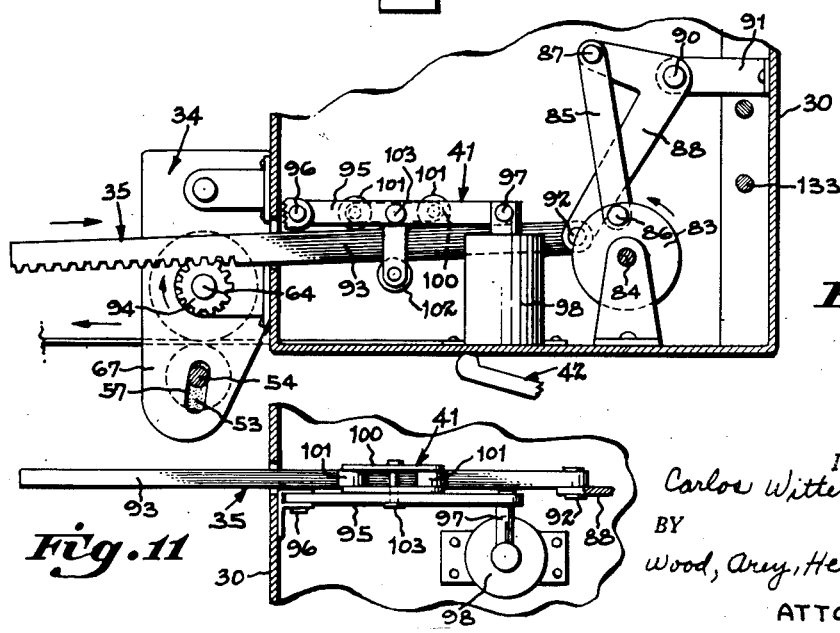
Fig. 10
Fig. 11

May 5, 1953  C. WITTENMYER  2,637,493
AUTOMATIC PRINTING APPARATUS FOR CALCULATING MACHINES
Filed Aug. 29, 1950  7 Sheets-Sheet 5

INVENTOR.
Carlos Wittenmyer
BY
Wood, Arey, Herron & Evans
ATTORNEYS.

May 5, 1953 C. WITTENMYER 2,637,493
AUTOMATIC PRINTING APPARATUS FOR CALCULATING MACHINES
Filed Aug. 29, 1950 7 Sheets-Sheet 6

May 5, 1953     C. WITTENMYER     2,637,493
AUTOMATIC PRINTING APPARATUS FOR CALCULATING MACHINES
Filed Aug. 29, 1950     7 Sheets-Sheet 7

Fig. 16

INVENTOR.
Carlos Wittenmyer
BY
Wood, Arey, Herron & Evans
ATTORNEYS.

Patented May 5, 1953

2,637,493

UNITED STATES PATENT OFFICE 2,637,493

AUTOMATIC PRINTING APPARATUS FOR CALCULATING MACHINES

Carlos Wittenmyer, Lebanon, Ohio

Application August 29, 1950, Serial No. 182,071

13 Claims. (Cl. 235—60.31)

This invention relates to calculating machines and is directed particularly to an apparatus arranged to be installed upon such machines to print automatically upon a record sheet the result or product of a calculation which is indicated visually by the result wheels or dials of the machine.

Modern calculating machines may be grouped into two general classes, one of which utilizes a shiftable carriage for mounting the result wheels or dials, while in the other class the result wheels are mounted within a stationary part of the machine; however the printing apparatus is intended for machines of either class. The machines are applied to the solution of various mathematical problems, multiplication, division, addition and subtraction being the principal ones. In solving a multiplication problem in a typical calculator, the factors to be multiplied are entered into the machine by pressing keys of one set, the factors of the multiplier are entered by depressing keys of a second set, then a key is depressed to close an electrical circuit and initiate the cycle of operation. The result wheels bear numerals from zero to nine upon their faces and includes gear teeth for rotating them individually to present the numerals to view and thus to indicate collectively the product of the factors multiplied.

In the type of machine employing a shiftable carriage, the carriage moves automatically to the right or left during the calculating cycle to bring the teeth of the result wheels into mesh with the mechanism which rotates them to indicating positions. At completion of the cycle the whole numbers of the product lie to the left of a stationary decimal mark with the decimal numbers to the right of the mark. There is provided a number of result wheels on the calculator sufficient to indicate numbers of extremely high value, consequently on normal operations there will appear both to the right and left of the figures of value, a number of zeros corresponding to the unused result wheels. After each calculation a cancelling device is operated which resets the machine by turning the result wheels back to zero.

Calculating machines are used for a variety of purposes and in many cases the results of the calculation must be copied upon record sheets for future reference. They are usually typed or copied by hand on form sheets and this extra operation naturally adds a considerable amount to overhead costs, particularly in large establishments where the volume is great. In addition to the expense, the copying of the figures, due to the human element, gives rise to mistakes since the work is extremely monotonous and tiring.

A primary object of the invention has been to provide a simple and reliable apparatus which may be interconnected with a standard calculating machine without substantial change, arranged to print rapidly and automatically the results of the calculations upon record sheets when the cancelling device is actuated to clear the machine.

When applied either to the shiftable carriage type of machine or the fixed carriage type, the apparatus is arranged to print upon a record sheet a series of figures corresponding to the product displayed upon the result wheels, the printing apparatus being in mesh with the result wheels and driven from a zero position to printing position during rotation of the result wheels back to zero as the machine is cleared. By this arrangement the operator is able to check for mistakes before clearing the machine and printing the result.

In general, the printing apparatus constitutes a series of pivotally mounted printing segments, connected with respective result wheels and responsive to rotation of the wheels; carriage rollers movable with respect to one another and arranged to shift transversely and to rotate so as to feed the sheets to and from printing position with respect to the segments; and type hammers arranged to impress the printing segment upon the record sheet when the sheet is in printing position. The various functions of the apparatus are performed by coordinating the operations of these basic parts with other components as disclosed hereinafter. The group of cooperating parts which constitute the apparatus are under the control of an electrical system which causes the operations to occur in predetermined sequence once the cycle is initiated. The control system is interconnected with the cancelling device of the calculating machine in such manner that upon operation of the cancelling device, the circuit is energized and remains in operation until the printing cycle is completed.

Further objects of the invention have been to provide a printing apparatus in which the carriage rollers meet in a plane with the desk top and thereby permit the record sheets to be placed conveniently upon the desk surface for automatic engagement by the rollers; to grip the sheet only during the actual printing operation thereby leaving the sheet normally unrestrained to permit convenient removal and replacement without adjustment of the apparatus; and also to provide a carriage arrangement which does not limit the width of sheets to be printed, the carriage having an unrestricted opening or throat at one end of the rollers to permit the free edge of the sheet to extend beyond the range of roller traverse.

Another object has been to provide a stepwise advancement of the record sheet into the printing apparatus whereby the ruled lines of a form sheet may be printed one by one with the next successive line always visible to the operator, permitting the figures on it to be entered on the calculating machine. By this arrangement the printed lines are concealed and the uppermost unprinted line is indexed for the convenience of the operator.

The entire printing apparatus is enclosed in a housing which is mounted upon the rearward portion of the calculator, extending laterally from the machine for a substantial distance. This extended portion constitutes the printing section and in it are housed the printing segments, the carriage rollers being mounted upon the exterior of this section and shiftable laterally with respect to the printing segments within it. The rollers are spaced one above another so as to meet in a plane common to the top of a desk upon which the apparatus is placed; thus the record sheets may be placed directly upon the desk top for engagement by rollers. In order to accommodate record sheets which are greater in width than the extended portion of the housing which mounts the rollers, the outer ends of the rollers are disconnected from one another to provide an open throat, the desk top having a clearance opening for the rollers and the lower roller having its end journalled on the desk while the upper roller is journalled above on the housing.

At the beginning of a cycle the carriage rollers are separated from one another thus permitting the record sheet to be placed upon the desk top with its upper edge positioned between the carriage rollers to be gripped by them at the beginning of the cycle. When the printing cycle is started, the carriage rollers automatically move together to grip the sheet, the carriage then shifts transversely to a predetermined position to locate the sheet properly with respect to the printing segments, then the rollers are rotated in a direction to feed the sheet inwardly to printing position. When the sheet reaches printing position there is a dwell period, the type hammers strike, then the rollers rotate in reverse to feed the sheet outwardly a distance less than the infeed to provide the stepwise advancement of the sheet between the rollers. Toward the end of the cycle the carriage rollers separate and release the sheet in its new position where it remains until the next operation.

By virtue of this operation the record sheet is free of engagement at all times except during the actual printing operation. This simplifies the use of the apparatus since a finished sheet can be replaced simply by locating it upon the desk top without any adjustment of the apparatus and also permits the sheet to be removed at any time without disturbing the apparatus. This is of particular advantage in handling small items such as sales slips, time cards and the like which require rapid placement and removal from the apparatus. It is also an advantage in handling the larger sheets inasmuch as the sheet can at any time be shifted about to bring into registry any desired portion of it for printing, thus increasing production speed and facilitating handling of the sheets.

A further object of the invention has been to prevent printing of unnecessary zeros which appear at the right and left sides of the figures of value upon the result wheels and to print the zeros appearing within the whole numbers and decimal places so that the figures may be limited to the whole number and a predetermined number of decimal places when printed upon the record sheet.

The zeros to the left of the first figure of value are eliminated automatically by the electrical system which deenergizes the type hammers of the left zero segments and those on the right following the last demical place are eliminated by deenergizing the type hammers automatically in response to the transverse position of the carriage rollers. The position of the carriage itself determines the number of decimal places, the carriage position in turn being regulated by selector switches which are selectively controlled by the operator as hereinafter described:

In the present disclosure which is intended to represent a simplified embodiment of the invention, the housing for the printing segments, type hammers and carriage rollers extends from the left side of the calculator. The segments are connected to the result wheels by individual rock shafts extending through the housing. These shafts are rotated by the result wheels by idler gears meshing with the result wheels and driving respective gear segments. The gear segments are linked to the rock shafts and the opposite ends of the shafts are linked to the printing segments so that rotation of the result wheels is imparted through the rock shafts to the printing segments. In the shiftable carriage calculators, the result wheels shift with the carriage and thus shift with respect to the idler gears; however the teeth of these gears are designed for this purpose and they are positively indexed in registered position to avoid interference in meshing.

In order to advance the printing segments to printing position during reset rotation of the result wheels, the idler gears are uncoupled during operation of the calculator, the printing segments thus remaining stationary at zero. After the result wheels rotate to indicate the product, the idler gears are coupled to the result wheels and when the calculator is cleared and the wheels rotate back to zero, the printing segments are correspondingly advanced to the reading previously indicated by the result wheels. After the printing cycle, the idler gears are automatically uncoupled from the result wheels and the printing segments then are returned to zero position by springs.

The rotation of the carriage rollers is developed by a crank motion, which at dead center, provides the dwell period for the printing operation. The crank motion is imparted to the roller through a motion increasing rack and pinion system and the differential infeed and outfeed rotation is obtained by disengaging the rack before completion of the outfeed so as to stop the sheet with the next unprinted line advanced to copying position. The rack is disengaged electrically by operation of the control system and can be adjusted to suit the spacing of various ruled sheets.

The transverse position of the carriage is determined by electrically operated stops which are engaged by actuating a series of decimal selector switches located at the front of the calculator. The position of the carriage in turn deenergizes the type hammers to the right of the last decimal place by means of a switch actuating bar which opens the circuit of the type hammers to the right of the carriage. In other words the hammers are automatically deenergized to the right of the carriage at any point in the carriage traverse range. The decimal place to be selected is indicated by the calculating machine when the calculation is complete. Under normal operation, two places are sufficient; however if a greater number of places is required, the switch actuating bar can be adjusted relative to the carriage to provide them.

As above noted, the excess zeros to the left of the whole number are eliminated automatically by deenergizing the type hammers to the left of the first digit of the result. This is accomplished quite simply by connecting the type hammers, which are electrically operated, in series with segment responsive switches interposed between each hammer. These switches are held open when the printing segments are in zero position and deenergize the hammer for that particular solenoid. The circuit is arranged to energize the hammers for the zero segments to the right of the first whole number so that the zeros within the result will be printed. This operation is not related to the carriage position.

In the present disclosure solenoids are employed for coupling the drive from the result wheels to the printing segments, shifting the carriage, and engaging the carriage rollers with one another during paper feed. They are used also to energize the type hammers and for disengaging the carriage feed rack from its pinion to provide the differential paper feed. It will be apparent that in place of these, small motors in certain cases, may prove more efficient, for example in shifting the carriage transversely.

The control system preferably constitutes a motor driven unit having switches which are opened and closed in proper sequence by cams mounted upon a common shaft and rotated once for each cycle of operation. Upon this shaft also is mounted the crank disk which drives the carriage rollers through their feed revolutions to impart the stepwise paper feed and provide the printing dwell period. The shaft is driven through reduction gearing at a rather slow speed and the several control cams are naturally rotated in unison to produce proper timing of the operations. In order to permit timing regulation, these cams are adjustably mounted upon the shaft.

The control unit is interconnected with the electrical system of the calculating machine in such manner that the motor is energized when the cancelling device is operated to clear the machine. As soon as the motor is energized it closes a holding circuit, causing the control unit to run through its complete cycle. This also couples the drive between the printing segments and result wheels of the calculator in order to utilize the reset rotation of the wheels to swing the segments to their printing positions.

The control unit runs through its entire cycle at a rapid rate while the calculator is clearing itself so that there is practically no time lost between operations. At the end of the cycle the printing segments return to zero and the apparatus is conditioned automatically for the next operation. Thus the apparatus responds to operation of the calculating machine to produce a typed record of the calculations without requiring any attention from the operator beyond selection of the decimal place and replacement from time to time of the record sheets.

Various other features and advantages of the invention will be disclosed in the following description, taken in conjunction with the drawings which illustrate one embodiment of the principles upon which the invention is based.

In the drawings:

Figure 3 is an enlarged sectional view taken on line 3—3 Figure 1, illustrating in greater detail the linkage connection from the result gears to the type segments and the general arrangement of the printing apparatus and carriage.

Figure 4 is a sectional view taken on line 4—4 Figure 3, illustrating the mechanism for coupling the result wheels to the type segment driving gear system.

Figure 5 is a fragmentary view illustrating one of the gear systems of Figure 4 in coupled relationship.

Figure 8 is an enlarged fragmentary sectional view taken on line 8—8 Figure 1, detailing the crank operated rack and pinion drive for rotating the upper carriage roller, the mechanism being shown at the beginning of a stroke with the record sheet feeding into the printing section.

Figure 9 is a view similar to Figure 8 showing the disengagement of the rack with respect to the roller pinion during the outward feed of the paper to index the sheet with respect to the type hammers and printing sectors.

Figure 10 is a view similar to Figures 8 and 9 showing the disk in its dead center position with the sheet momentarily in a stationary position for the printing operation, showing also the solenoid operated rack lifting mechanism.

Figure 11 is a fragmentary plan view projected from Figure 10, further detailing the lift solenoid mechanism associated with the rack.

Figure 12:
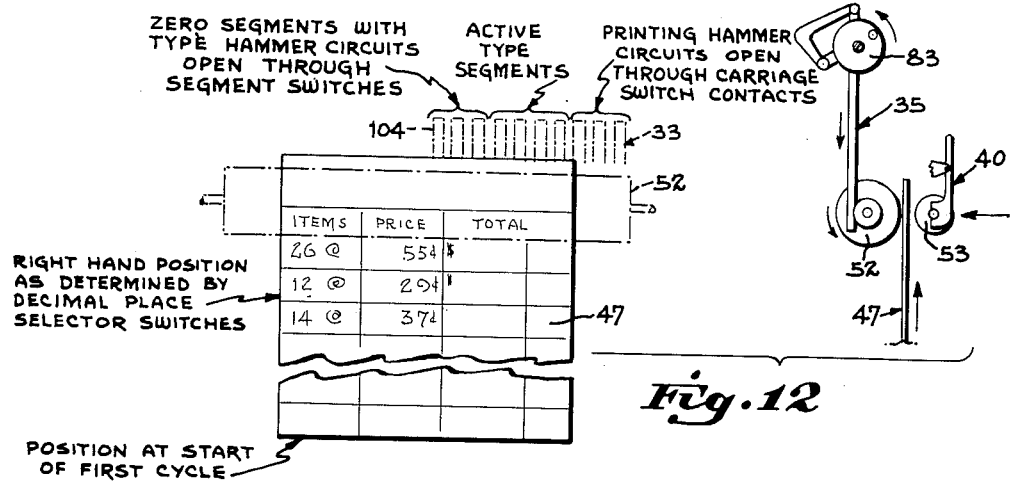
Figure 13:
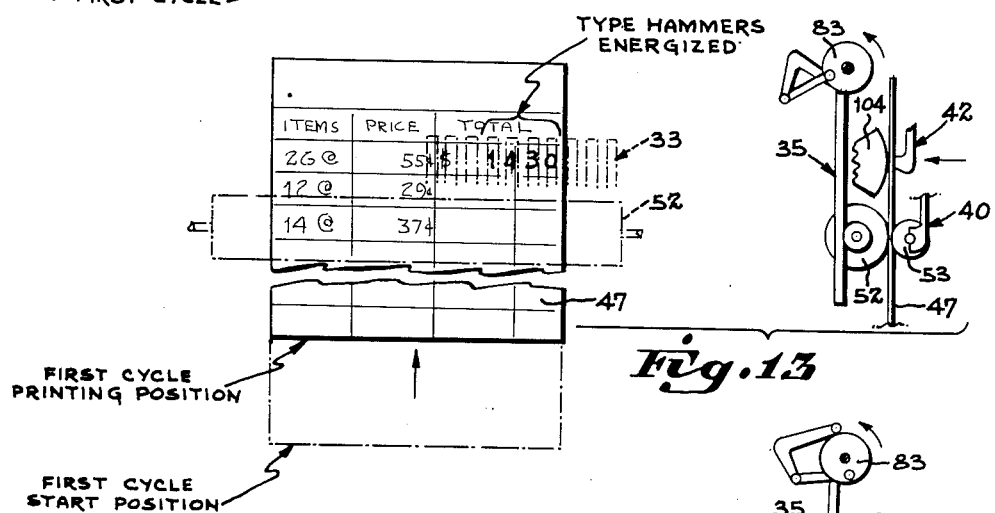
Figure 14:
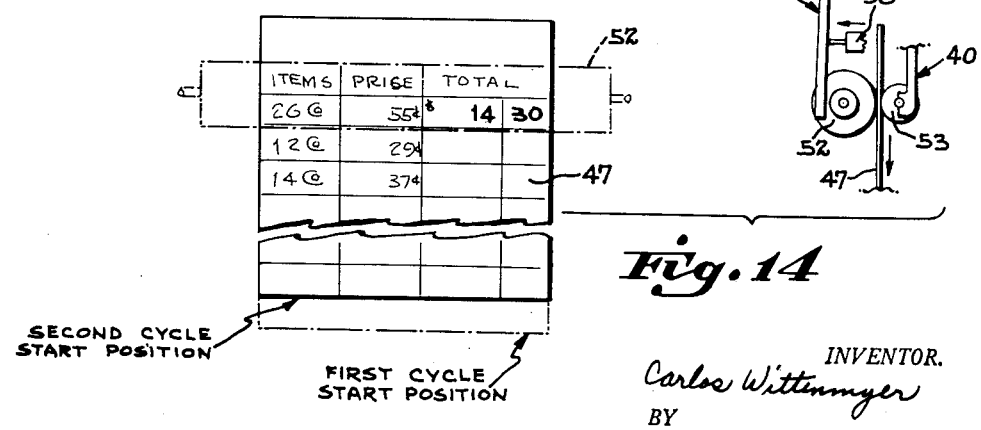

Figures 12 to 14 inclusive are diagrammatic views showing a typical sales slip, its relationship to the carriage roller and type segments for the purpose of illustrating the stepwise advancement of the slip to bring the item lines successively into position above the type hammers for printing the totals upon them. At the right side of each view there is disclosed a diagram showing the action of the carriage driving crank and rack mechanism in a position corresponding to the movements executed by the sales slip.

Figure 15:
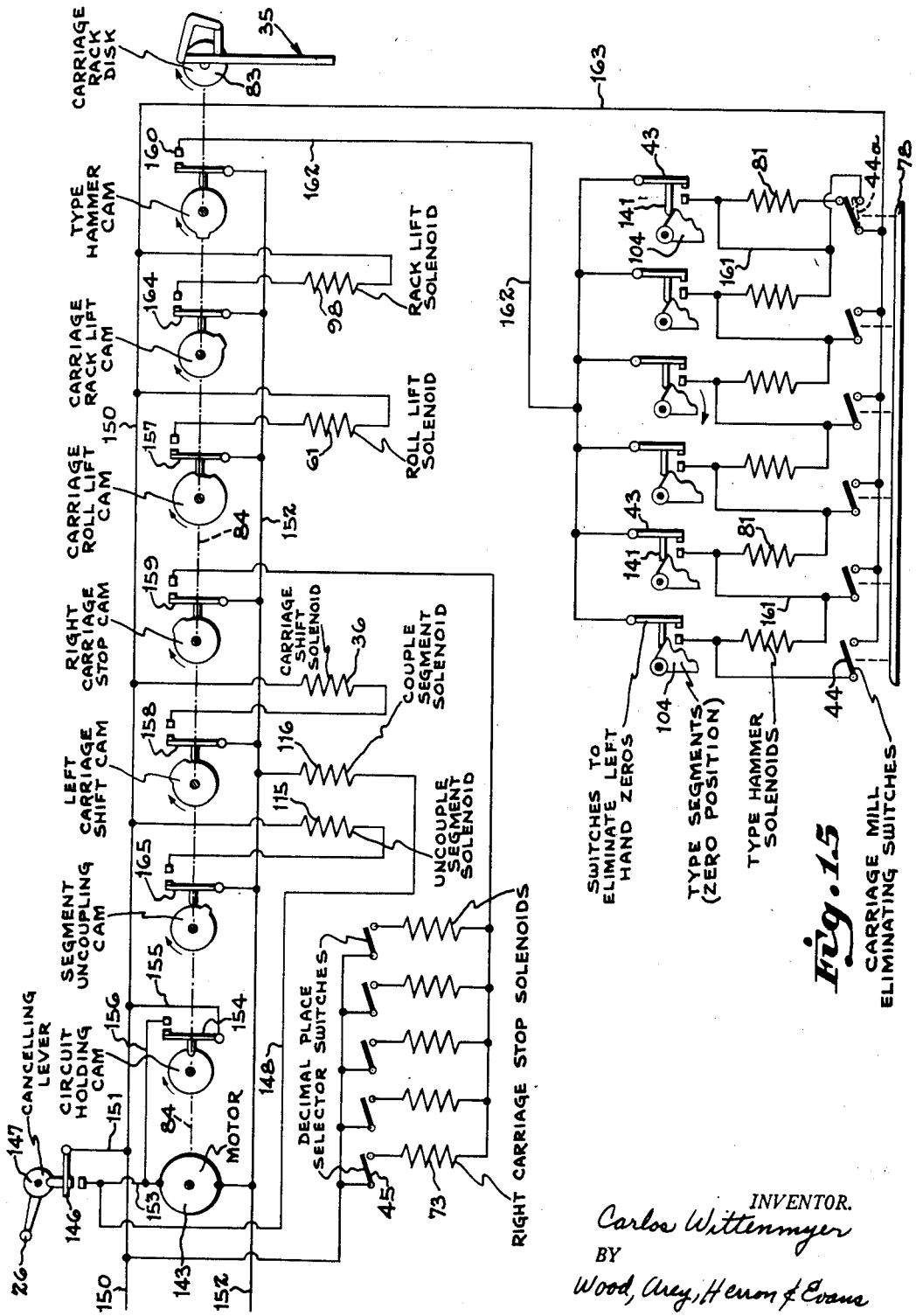

Figure 15 is an electrical diagram illustrating the system for regulating the movements of the various components of the apparatus.

Figure 16 is a chart illustrating the sequence of operations during an operating cycle and their timing with respect to the rotation of the carriage feed rollers.

General arrangement

Figure 1:
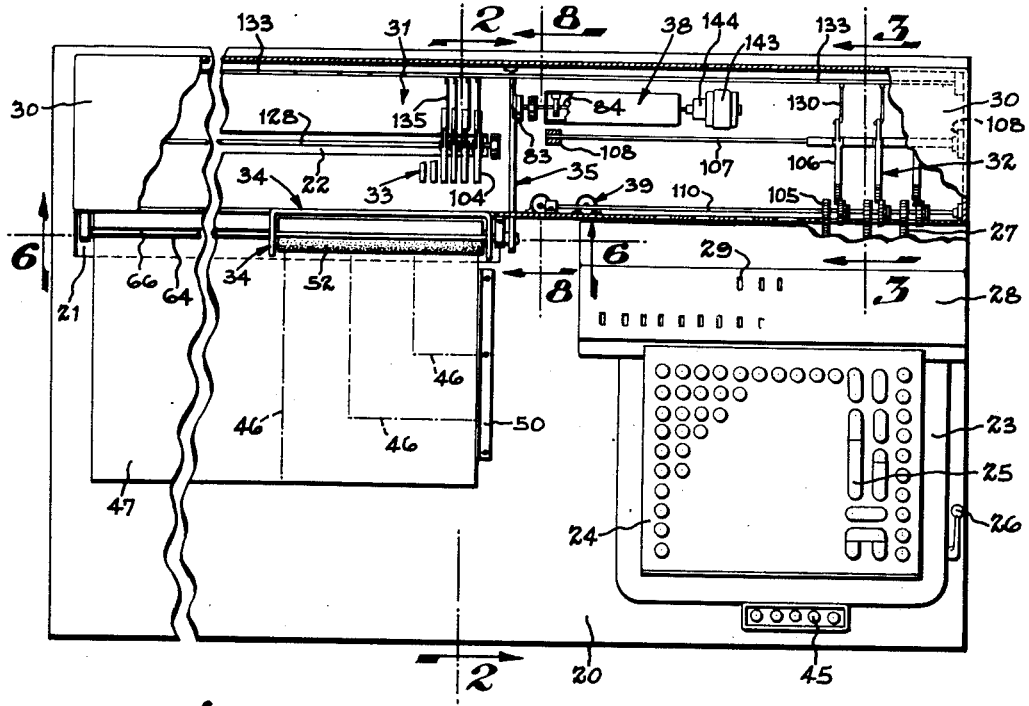
Figure 1 is a plan view of a calculating machine equipped with the printing apparatus, a portion of the desk and carriage mechanism at the left being removed in order to illustrate the full length of the printing section of the apparatus.
Figure 2:
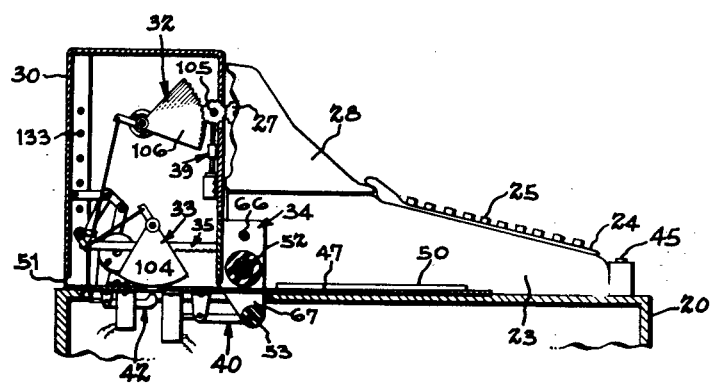
Figure 2 is a sectional view taken on line 2—2, Figure 1 illustrating the general arrangement of the printing apparatus and its interconnection with the result gears of a calculating machine.

The apparatus is shown in Figures 1 and 2 in conjunction with a calculating machine to disclose the general arrangement of the structure. With the exception of the result wheels, the operating parts of the calculator have been omitted since they are not relevant to the invention. The structural details of the printing apparatus are illustrated in the detailed drawings taken upon section lines indicated in Figure 1.

Described generally, Figure 1 illustrates a desk 20 having an elongated opening 21 extending widthwise at the carriage traverse range to accommodate the carriage feed rollers. The desk includes a second opening 22 for the type hammers as hereinafter described in detail. Upon the desk there is shown a conventional calculating machine indicated at 23 having the usual keyboard 24 and tabs 25 for controlling the various operations of the machine. Along the right hand side of the machine there is located a cancelling lever 26 which clears the machine after the calculating cycle is completed. The result gears 27 (Figures 1, 2 and 3) are mounted in the carriage 28 and are rotated to positions by the machine to expose a series of result figures which are visible through the windows 29. After the calculation, the cancelling lever is operated and this initiates a cycle of operation to turn the result wheels back to zero, and coincidentally, starts the printing cycle.

The apparatus may be applied to most modern calculators which are provided with result gears or dials, and this construction is practically standard in the industry. The cancelling lever 26 and the result gears are the principal elements of the calculating machine which are utilized in conjunction with the printing apparatus, the result wheels serving to set the type sectors to positions for printing the result and the cancelling lever being interconnected in the control system of the printing apparatus to initiate automatically the printing cycle. It will be understood that the actuating means for resetting the calculator may be in the form of a tab or switch instead of the lever illustrated and that such devices are interconnected with the electrical system of the printing apparatus substantially in the manner disclosed.

Conventional calculating machines with which the apparatus is intended to cooperate are arranged to solve a wide variety of problems and are used most extensively for multiplication, division, addition and subtraction. The printing system is in direct connection with the result wheels and includes type figures from zero to nine, duplicating the figures carried by the result dials; consequently any problem which the calculator is capable of solving will be printed automatically in accordance with the result displayed by the result wheels.

The printing apparatus disclosed generally in Figures 1 and 2 consists of a housing 30 arranged to be secured to the rear of the calculator and having a printing section 31 extending laterally from one side of the machine. Within the housing 30 is mounted a driving system indicated at 32 interconnected with the result wheels 27 of the calculator. A plurality of type segments or sectors 33, somewhat less than the number of result wheels, is mounted pivotally within the printing section. A translatable carriage 34 for shifting the sheets printed relative to the type segments is mounted upon the printing section and a rack and pinion driving system 35 for rotating the carriage rollers is mounted within the printing section. A solenoid apparatus 36 (Figures 6 and 7) for translating the carriage and a carriage positioning stop mechanism 37 is also mounted within the printing section.

The driving system 32 transmits the movement of the result wheels 27 to the printing segments 33 in order to set up the result figures corresponding to the position of the result wheels. The carriage rack and pinion driving system 35 rotates the carriage rollers to feed the record sheet to printing position with respect to the type segments 33. The carriage solenoid 36 shifts the carriage and sheet laterally with respect to the segments and the stop mechanism holds the carriage at selected positions. These movements are executed in sequence under the control of the regulating unit 38 mounted within the housing 30 after the cancelling lever is depressed to clear the calculating machine.

In addition to the foregoing, the type sector driving system 32 is coupled and uncoupled automatically by a solenoid actuated shifter 39 (Figure 4), and the lower roller of the carriage is raised and lowered to release the sheet by a solenoid and lever arrangement 40 (Figure 3). Also the carriage rack 35 is engaged and disengaged during its cycle of operation by a rack lift solenoid 41 (Figure 10) and the figures are printed upon the sheet by a series of solenoid actuated type hammer units 42 (Figure 3).

Figure 6:
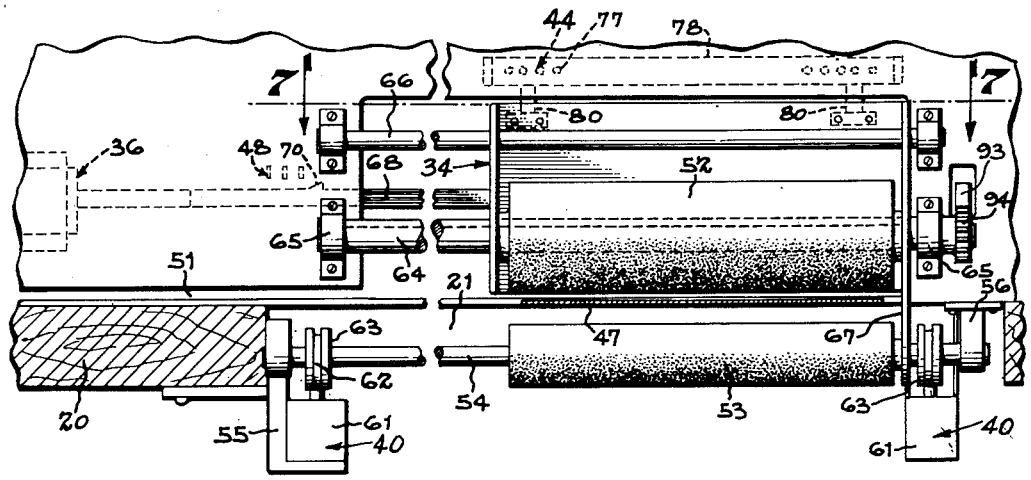
Figure 6 is a fragmentary sectional view taken on line 6—6 Figure 1, illustrating the carriage mechanism and feed rollers.

As described in greater detail at another point in this specification, the excess zeros which appear upon the result wheels to the left of the digits are eliminated by a series of type segment switches 43 (Figure 3) and the excess zeros and digits to the right of the last decimal place are eliminated by a series of switches 44 associated with the carriage as shown in Figures 6 and 8. In printing the answer upon the sheet it is necessary to select the decimal place in accordance with the decimal place indicated by the calculating machine. In the sales slip illustrated in Figures 12 to 14, there is provided a separate column for the whole and decimal figures respectively. The decimal place selection is performed by manually depressing one of the decimal place selector switches 45 (Figure 1), these being grouped at the forward edge of the calculating machine. These switches are interconnected with the carriage stop mechanism 37 to control the lateral position of the carriage and thus position the sales slip with respect to the selected type segments so that the figures are printed respectively in the whole number and decimal columns, or in the example illustrated, in the columns marked dollars and cents, thus eliminating mills from the printed result.

Operation

As above noted the apparatus is intended to print various classes of record sheets, for example, time cards, sales slips, as well as the various wide ruled sheets used in bookkeeping and accounting practice. Because of the infinite variety of such sheets, the printing section 31 overhangs the desk in cantilever fashion with its left end disconnected from the desk top, so that a sheet wider than the overhang can be placed between the carriage feed rollers. Several sizes of such sheets are indicated by the broken lines 46 in Figure 1, a large sized sheet being indicated 47.

The sales slip illustrated in Figures 12 to 14 provides a typical example of the functions of the apparatus since it involves the typical problems of recording calculator results and illustrates in a simple manner the structure and operation for arriving at a satisfactory solution. As shown, the sales slip includes a number of items and prices to be calculated by the machine and printed in dollars and cents and it will be apparent that other problems involving units and decimal figures can be treated in the same manner.

By virtue of the normally disengaged carriage roller and interrupted rotation of the feed rollers, the sales slip can be placed upon the desk surface with its top portion extending between the carriage rollers at the start of the operation. This facilitates the handling of the slips and permits the operator to observe and enter into the calculator the items and price figures, starting at the top line of the slip. When the keys are depressed, the calculating machine runs through its cycle and arrives at a total which appears in the windows 29.

By the automatic operation of the control unit 38, which is initiated by the cancelling lever, the type sectors are swung to the positions corresponding to the result figures (Figure 3), then the slip is fed inwardly toward the type segments a distance sufficient to align the top line with the sectors to print the result. The slip stops momentarily at this point in its movement, the type hammers are energized to print the sector figures, then the slip is fed outwardly from the sectors until it reaches the position shown in Figure 14. At this point the rack 35 is lifted by solenoid mechanism 41 out of engagement with its pinion, causing the slip to stop with the next line in a position to be read by the operator and entered into the calculator. This operation is repeated for each line, in each instance the slip being fed inwardly an equal distance to bring the successive lines into registry with the segments but being fed outwardly a reduced distance. This differential movement presents to the operator the successive lines of figures and produces the stepwise sheet advancement. After each cycle of operation, the carriage rollers separate and release the slip so that when the calculation is completed the operator simply removes the finished slip and places the next one upon the desk top with the first line presented to view.

When the calculation is completed the operator depresses the indicated decimal selector switch and then depresses the cancelling lever to clear the machine for the next operation. The control unit 38, as hereinafter is described in detail, thereupon causes the result wheels 27 to be coupled to the printing sectors so as to swing them to positions to print a series of result figures corresponding to the figures previously displayed by the result dials as the dials rotate back to zero. Then the carriage rollers grip the sheet, the carriage is shifted to the left, the carriage stops 48 are operated when the carriage reaches its left hand limit and then moves to the right into abutment with the selected stop in accordance with the decimal place switch 45 which was previously selected. The type hammers strike at the moment the sheet reaches its inward limit and is about to reverse its feeding direction, then the printed sheet is fed outwardly to its second position.

It will be observed therefore, that the position of the figures to be typed upon the slip is determined by rotation of the carriage rollers, combined with the lateral shifting of the carriage relative to the active type segments. In other words, the longitudinal shift of the sheet locates the item lines with the type hammers and type figures and the lateral shift aligns the unit and decimal columns with the corresponding type segments.

The type impression is printed by a typewriter ribbon 49 (Figure 3) which is interposed between the printing face of the type segments and the sheet to be printed. The details of the ribbon feed are not disclosed but it will be understood that the ribbon can be fed by conventional mechanism similar to that used in typewriters.

Upon reference to Figures 12 to 14, it will be observed that the excess ciphers or zeros to the left of the result, are omitted automatically by the segment switches 44, as disclosed in detail hereinafter. The excess decimal places to the right, which also appear on the calculating machine result, are omitted from the sales slip by operation of the carriage operated switches, which also are disclosed in detail at a later point in this description.

In setting up the machine for printing a given record sheet, such as the sales slip illustrated, it is necessary for the operator to adjust laterally the right hand guide member 50 (Figure 1) which is adjustably mounted upon the desk top. From this point the carriage automatically shifts the slip to the left and then to the right into abutment with the carriage stops 48 to locate the columns with respect to the type segments and thus to establish the decimal place. After the apparatus is set up for a given size sheet, successive sheets will be automatically printed without further attention on the part of the operator other than to depress a decimal place selector switch corresponding to the decimal place indicated by the calculator at completion of the calculating operation. Thus successive identical sheets are placed against the guide 50 and the carriage, upon each cycle will return to its right hand position and the rollers will move together to engage it. Upon engagement, the carriage and rollers will shift with the sheet to the left and return to the right against the carriage stops in the previous position unless the decimal place switches have been actuated to change the number of figures in the whole number. Thus, if the series of slips to be typed are duplicates of one another and the whole number result is the same for each item, the decimal selection switches need no further attention from the operator and the apparatus will print the successive sheets with the decimal place located automatically. This is the preferred mode of operation since it simply requires proper adjustment of the guide member after the first sample slip is printed.

*Carriage mounting structure*

Figure 7:
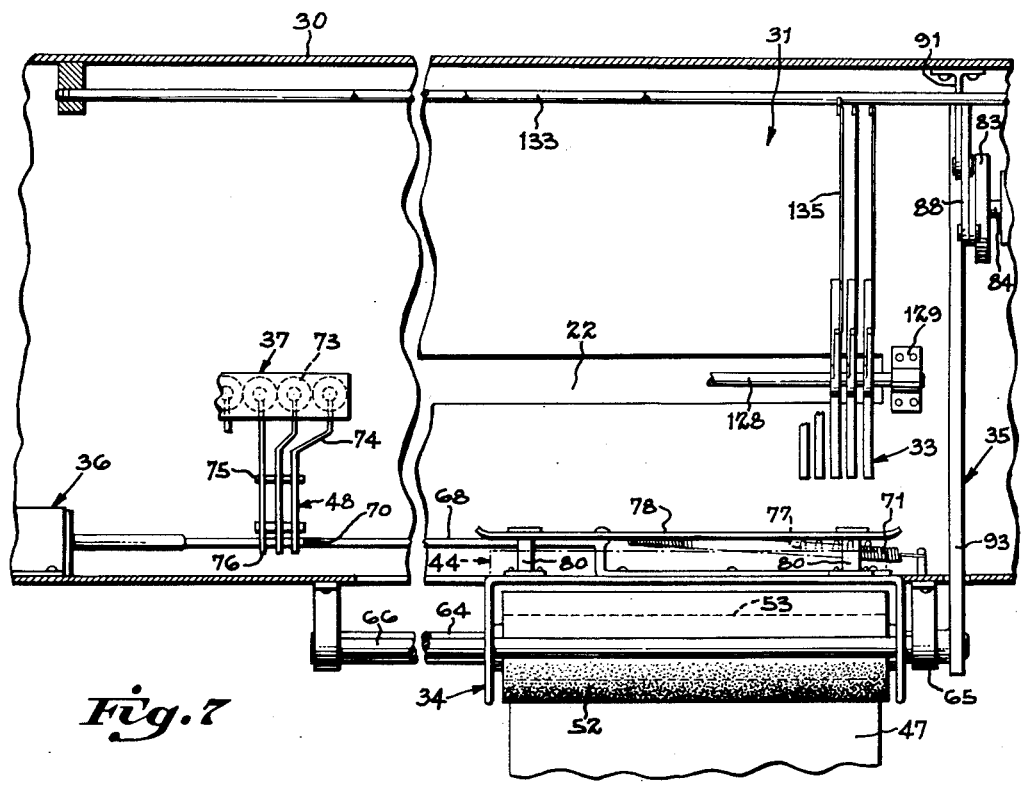
Figure 7 is a sectional view taken on line 7—7 Figure 6, further detailing the carriage structure.

As disclosed most clearly in Figures 1, 6 and 7, the operating parts of the printing apparatus are enclosed by the printing section 31, projecting from housing 30 which is attached directly to the rear of the calculating machine. The housing 30 may be designated as a drive section since it encloses the mechanism for transmitting the movements of the result wheels to the printing section. In the disclosed embodiment, the printing section 31 extends a substantial distance to the left and includes a slot 51 to receive the upper edge of the record sheets. The slot preferably extends around the end wall and rear wall so as to provide an open throat which permits the left side of wide sheets to extend beyond the housing. Thus there is no limit to the width of the sheets which may be printed (Figures 2 and 6).

The upper carriage roller 52 is supported upon the printing section 31 independently of the lower roller 53 so that there is no interference at the left hand end of the carriage which would limit the width of the sheet. The opening 21 in the desk top extends for the full carriage traverse range and provides clearance for the lower roller. As shown in Figure 6, the lower roller 53 is mounted slidably upon a shaft 54 having its left end journalled in a bracket 55 which is secured to the desk top, thus providing an open throat at the left side to accommodate the extended edge of the wide sheets. The right end of shaft 54 is connected to the carriage by a bracket 56.

The brackets for the lower roller shaft include arcuate slots 57 (Figures 3 and 10) to permit the shaft and roller to be swung into engagement with the upper roller by the solenoid units 40—40. These units are associated with the respective brackets 55 and 56 as shown in Figure 6.

Each solenoid unit 40 constitutes a lever 58 pivoted intermediately upon a respective bracket 59, one of which is mounted upon housing 30 (Figure 3) the other being associated with the underslung left hand bracket 55 which is secured to the desk top 20 to provide the open throat 21. The inner ends of the respective levers 58 are pivotally connected as at 60 to the lift solenoids 61 and the outer ends of the levers each include a yoke 62 engaged between collars 63—63 (Figures 6 and 9) secured to shaft 54. When the solenoids are energized the lower roller swings into engaged position with the upper roller to grip the sheet 47 and to be translated in unison with the upper roller as the carriage is shifted transversely during the cycle of operation.

The upper roller 52 is slidably keyed to a drive shaft 64 loosely journalled in bearing brackets 65—65 (Figures 6 and 7). The carriage 34 consists of a U-shaped plate slidably mounted upon shaft 64 and upon an upper slide rod 66. The carriage 34 includes a downwardly projecting yoke 67 connected to the lower roller so that both rollers shift in unison. The carriage as a unit is shifted by the solenoid 36 which includes a drawbar 68 having a stop tooth 70 on its upper surface (Figures 6 and 7). The drawbar is biased by a tension spring 71 so that the carriage is shifted to the left when solenoid 36 is energized and is pulled to the right by spring 71 when the solenoid is deenergized.

The carriage stop assembly 37 consists of a series of solenoids 73 operatively connected to individual stop levers 74 pivotally mounted as at 75 and having their ends 76 spaced the same as the segment spacing and arranged when in downward position to engage the stop tooth 70 and thus to locate the carriage and the sales slip in alignment with the active type segments.

The number of segments and stop arms is determined by the type of calculating machine to which the apparatus is applied and the type of work which the machine is intended to perform; however, there is illustrated in the drawings only a sufficient number of segments and stops to illustrate the mode of operation. The stops 48, by operation of the control unit 38 as hereinafter described, remain in operating position until the carriage reaches its left hand limit of travel then the selected stop swings downwardly to abut the stop tooth 70 upon right hand travel of the carriage.

The excess decimals to the right are eliminated by a series of individual switches having stems 77 which are held in depressed position by the switch actuating bar 78 mounted upon the carriage by brackets 80—80 (Figures 6 and 7). The switches may be of any suitable design and the stems 77 correspond in number and spacing to the printing segments. They are arranged to open the circuit to the individual type hammer solenoids 81 (Figure 3) to prevent operation of those beyond the last decimal place. In the present instance figures in excess of two decimal places or mills are eliminated. Assuming that the slip shown in Figures 12 to 14 is to be printed, the bar 78 will disengage the stems beyond the right hand edge of the slip as determined by the carriage position shown in Figure 12, opening the type solenoids circuits to the right of the second decimal place. Unnecessary zeros to the left of the whole number are eliminated from the printed result by the type segment switches 43 (Figure 3) hereinafter described. The switch bar 78 preferably is adjustably mounted with respect to the carriage to permit the number of decimal places to be varied; thus, in making mathematic calculations requiring a result carried to three or more places, the bar will be adjusted to the right with respect to the carriage.

*Carriage roller drive*

The structure for rotating the upper carriage roll 52 to provide the motion diagrammed in Figures 12 to 14 is best disclosed in Figures 8 to 11. The crank disk 83 which develops the roller rotation, is driven in unison with the components of the control unit 38, the disk being mounted upon the end of the shaft 84 of the unit as shown in Figure 1. A link 85 is pivotally connected to the crank pin of the disk as at 86 and has its opposite end pivotally connected as at 87 to a bell crank lever 88. The bell crank lever is pivoted as at 90 upon a bracket 91 mounted upon the rear wall housing 30 and has its lower end pivotally mounted as at 92 to the rearward end of a rack bar 93.

The bell crank lever 88 multiplies the throw of crank pin 86 to provide a sufficient rack stroke for feeding a given point or line of the sales slip from the exposed position at the front of the roller to a printing position between the type hammers and segments. The outer portion of rack 93 engages the teeth of a rack pinion 94, which is keyed upon roller shaft 64. In the position shown in Figure 8 at the beginning of an operating cycle, the crank pin 86 is in dead center position and when the crank pin 86 reaches an opposite dead center position as shown in Figure 10, the rearward feed of the sales slip momentarily is halted. At this point the type hammers strike the type figures on the downwardly exposed faces of the type segments to impress the result upon the sheet. The disk 83 continues its rotary movement and as the dead center position is passed, the link begins to swing the bell crank lever and rack in a rearward direction, thus feeding the sales slip outwardly as indicated by the arrows in Figure 10.

Toward the end of the return stroke, the rack lift solenoid 41 is energized to disengage the rack teeth from pinion 94 as shown in Figure 9, and thus to reduce by one item line the outward feed of the slip. This brings the slip to a stop with the next line exposed for copying and thus produces the stepwise advance of one line for each cycle. The control unit shaft 84 and crank disk make one complete rotation for each cycle of operation, the cycle beginning and ending at the dead center position so as to provide the momentary printing stop at the middle of the cycle. This movement is diagrammed in Figure 16.

The rack lift solenoid assembly 41, as disclosed in Figures 10 and 11, constitutes a lever 95 having its outer end pivotally mounted as at 96 upon a bracket secured to the forward wall of printing section 31 and its swinging end pivotally connected as at 97 to the lift solenoid 98. Approximately at the center of lever 95 there is pivoted a roller unit 100 having spaced upper rollers 101 and a lower roller 102 with the rack tracked between them. The unit is pivoted as at 103 to lever 95 so as to accommodate the change in the angular relationship between the rack and lever during the lifting movement. The lift solenoid assembly 41 is located along the right end of the carriage in a position clear of the edge of the sales slip or sheet so that there is no interference during feeding of the sheet.

*Actuating system for printing segments*

The printing segments 104, as disclosed in Figure 3, include raised type along the arcuate printing faces running from zero to nine as indicated along the side of the segment. The apparatus is provided with a set of segments equal to the maximum number of digits which it is desired to print. For average work a set of ten segments is sufficient although if the apparatus is to be applied to complex mathematical problems, a set of segments corresponding in number to the result wheels of the calculating machine may be utilized.

The segments are swung individually from the zero position shown in Figure 3 to print figures corresponding to those appearing on the calculating machine by means of the driving system 32 which is in driving connection with the result gears 27.

In the present disclosure, as indicated by the arrows in Figure 3, the segments are swung individually to their printing positions during the reset rotation of the result gears 27. In other words the segment driving system is uncoupled from the result gears during the calculating operation so that the result gears advance relative to the segment driving system. After the result gears have rotated to the various positions representing the result of the calculation, the calculating machine may be cleared for the next calculation by operation of the cancelling lever. This causes the segment driving system to be coupled to the result gears just before the result gears are rotated back to zero by the operating mechanism of the calculator.

By coupling the individual segment to the result gears before the cancelling operation takes place, the reverse rotation of the gears to zero is effective to advance the printing segments to positions corresponding to the reading previously shown upon the result gears. When the result gears reach their zero positions the same reading will have been transferred to the printing segments subsequently to be printed upon the sheet. This allows the operator to check the result of the calculation before printing it and to select a decimal switch according to the decimal point indicated by the calculator. After the printing operation, the segment drive is uncoupled permitting the segments to return to their zero positions ready to be repositioned upon clearing the calculator after the next calculation.

The mechanism for coupling the result gears 27 to the type segments is illustrated in Figures 3, 4 and 5. Rotation of the result gears of each printing segment 104 is transmitted by way of an idler gear 105 to a gear segment or sector 106 pivotally mounted upon a shaft 107 suspended from brackets 108 within the housing 30. As shown in Figures 4 and 5, each idler gear 105 is loosely journalled upon shaft 110 and meshed with a respective result gear 27. Rotation of the result gear in the forward or indicating direction rotates the idler gears 105 but is ineffective to swing the printing segments since the coupler gears 111 are disengaged from the idlers 105. As shown in Figure 4 each coupling gear 111 is provided with a taper pin 112 arranged to enter one of a series of ten holes 113 formed in the idler gear 105.

The coupler gears are shifted in unison with respect to the idler gears by means of a shift bar 114 which is shifted alternately to the right and left by means of the solenoids 115 and 116. The solenoid armatures are connected to a rock bar 117 having a forked lever 118 engaged upon a pin 120 secured to the shift bar. The right hand solenoid 115 uncouples the gears by shifting bar 114 to the right and solenoid 116 couples the gears by shifting the bar to the left as shown in Figure 5. The bar is latched in coupled and uncoupled positions by a detent 121 engaging the notches 122. The coupling gears are shifted by yokes 123 having their lower ends secured to bar 114 with their upper ends engaged in a grooved hub 124 formed on the coupling gears.

When the cancelling lever is operated the coupling solenoid 116 is immediately energized to connect the coupling gears to the idler gears and thereby to establish a driving connection from the result gears 27 to the gear segments. Upon reverse rotation of the result gears the coupling gears which are now coupled to the idlers, drive the gear segment in the direction indicated by the arrows in Figure 3. The broken line indicated at 125 indicates which zero position of the gear segment and the broken line 126 indicates its upper limit of movement. The movement of the gear segment is transmitted to the printing segments by means of respective linkage systems one between each gear and corresponding printing segment.

Each linkage system consists of a primary link or rod 130, having its upper end pivotally connected to a short lever 131 extending from the pivoted end of the gear segment with its lower end connected to a lever 132 fixed upon a rock shaft 133. These shafts extend laterally for the full length of the housing and transfer the gear segment movements to the printing segments. A second lever 134 of the same length but angularly related to the lever 132 is fixed upon the rock shaft in the printing section and has its swinging end pivotally connected to a second link 135. Link 135 has its opposite end pivotally connected to a lever 136 extending upwardly from the printing segment. The length of levers 131, 132, 134 and 136 are equal and the radius of the printing segment and gear segment 106 also are equal so that a given movement of the gear segment is transmitted through the linkage to the printing segment.

As above noted, the idler gear 105 is provided with ten holes corresponding to the figures from zero to nine and this gear is rotated to present the holes to the taper pin 112 in accordance with the advancement of the result gears 27. For example, if the result wheel is advanced to present the figure five, gear 105 will have advanced five holes so that upon coupling of gear 111 and rotating in reset direction five holes back to zero, the printing segment will be advanced to a position to print the numeral five when the printing hammer is energized.

As shown in Figure 3, each printing segment includes a tension spring 138 arranged to urge the segment toward its zero position so that upon uncoupling at the end of the printing cycle all of the segments will automatically snap back to zero as indicated by the broken line 140 thus, returning the gear segments 106 and coupling gears 111 also back to zero position. Each type segment also is provided with a respective switch 43 having a stem 141 in alignment with the edge of the segment and adapted to be depressed when the segment is in zero position. Each switch 43 is interconnected with the type hammer solenoid of that particular segment so as to prevent operation of the type hammers and thereby eliminate the printing of zeros to the left of the whole number.

As shown in Figure 1, the type segments are located a considerable distance to the left of the gear segments 106 which drive them and the movements of the gear segments are transmitted to the type segments by rotation of the rods 133 which carry the levers 132 and 134. The printing segments are loosely pivoted upon a shaft 128 (Figure 3) having its opposite ends supported by brackets 129 which are mounted in the printing section 31. The rods 133 in the present example are mounted one above the other for clearance purposes and provide a convenient means for transferring the movements from the gear to the type segments since they may be extended for any reasonable length. The levers 132 and 134 preferably include set screws for locking them non-rotatively upon the rods at proper angulation with respect to one another. For most efficient and accurate results the levers should be disposed approximately at right angles to the links with which they are connected.

*Control system*

The various operations previously outlined are executed during each cycle by operation of the control unit 38 shown in Figure 1 which incorporates the circuit shown in Figure 15. This unit in general constitutes an electric motor 143 having a gear reduction unit 144 arranged to drive the shaft 84 at a relatively slow rate of speed. Shaft 84 carries upon its outer end the previously described crank disk 83 and includes along its length a series of cams arranged to operate the switches which control the various components of the machine. These switches and cams are enclosed in the unit 38 (Figure 1) which provides a mounting surface for the switches. The cams and switches are shown diagrammatically in Figure 15 together with the control circuit and operating components of the apparatus. Since the switches may follow any standard design they have not been illustrated in detail but their operation will be apparent from an analysis of the circuit with which they are interconnected.

The circuit preferably operates upon the standard A. C. service voltage so that the apparatus can be plugged into any convenient outlet. The operation of the system can best be understood by following the sequence of operations which occur automatically when the cancelling lever is depressed by the operator to clear the calculating machine. As above noted, this operation immediately couples the type segments to the result gears so as to position them to print the result when the result gears are reset to a zero position.

When the canceling lever 26 is actuated, it completes a circuit within the calculating machine (not shown) and at the same time, movement of the lever closes a switch 146 which is actuated by a cam 147 fixed upon the axis of the lever (Figure 15). This cam and switch may be added to the cancelling lever in any convenient manner. When switch 146 closes, it immediately energizes the coupling solenoid 116 by way of line 148, the power line 150 being connected by a branch line 151 to the pole of switch 146 for this purpose. The opposite terminal of solenoid 116 is connected directly to the second power line 152. The cam and switch 146 and 147 preferably are arranged to establish a circuit to solenoid 116 just before the calculating machine begins its clearing operation so that the type segments are coupled before the result wheels begin to rotate back to zero.

Simultaneously with the operation of solenoid 116, a circuit is also established to the control unit motor 143 by way of line 153 from switch 146. The opposite terminal of the motor is directly connected to power line 152 so that the motor begins rotating when the coupling solenoid is energized. Operation of motor 143 drives shaft 84 causing rotation of the holding circuit cam. Rotation of this cam immediately closes switch 154 and thereby establishes a holding circuit from power line 150 by way of branch line 155 through switch 154 to the motor by way of line 156. This circuit keeps the motor running for one complete cycle which corresponds to one revolution of shaft 84 and thus permits the cancelling lever to be released. The control system is now under automatic operation and will run through a complete cycle and stop when the holding switch 154 is opened at the end of the cycle.

The sequence of operations performed during the cycle are shown in Figure 16 in the order in which they occur. As soon as the control shaft and cams begin to rotate, the carriage roll lift cam closes switch 157 to energize solenoid 61 and shift the lower roller upwardly to grip the sheet. Shortly thereafter the switch 158 of the left carriage shift cam is closed causing the carriage solenoid 36 to be energized, drawing the carriage to its left hand position so that it may be indexed by the stop bars 76 upon returning to the right under influence of spring 71. The period during which the solenoid is energized with respect to the other operations, as shown in Figure 16, is determined by the lobe of the carriage shift cam. Thus, while the carriage is maintained in its left hand position by solenoid 36, the right carriage stop cam closes switch 159 to energize stop solenoid 73 depending upon which of them have their circuits closed by the decimal place selector switch 145. The selected switch is closed by the operator before operating the cancelling lever to determine the number of decimal places in the printed result and is arranged to remain closed unless manually opened by the operator.

When the lobe of the carriage shift cam opens switch 158, the carriage will move toward the right under the influence of spring 71 until the tooth 70 (Figures 6 and 7) engages the stop 76 corresponding to the closed decimal place switch, thus aligning the carriage and record sheet columns transversely with the active type segments in position for printing the result, as shown in Figure 12. The lobe of the carriage roll lift cam is arranged to hold the roll in elevated position almost to the end of the cycle as indicated in Figure 16 whereupon the roll is lowered to release the printed sheet.

It is to be observed at this point that the crank disk is rotating along with the cams, causing rotation of the upper carriage roll to feed the sheet inwardly toward printing position after the sheet is positioned transversely. When the sheet reaches the position shown in Figure 13, corresponding to a half revolution of the crank disk, the type hammer cam closes its switch 160 to energize the type hammers at the moment the crank pin passes its dead center position, with the slip held momentarily in stationary position.

The type hammer solenoids are energized through the segment switches 43 which are held in open position when the type segments are in zero position as shown in the circuit diagram. The segment switches, as previously noted, are arranged to eliminate the zeros to the left of the digits appearing in the result (Figure 12), but at the same time, to print the zeros between digits and to the right the last digit within the decimal as in the example ($14.30), shown in Figure 13. For this purpose the type hammer solenoids each have one terminal connected to a corresponding segment switch 43 and each solenoid is connected in series with the next solenoid to the right by the lines 161 as shown in Figure 15. Each type hammer switch 43 is connected to power line 152 through cam switch 160 by way of line 162 which is connected in common to all of the segment switches.

The circuit through the type hammer solenoids 81 is completed to power line 150 by way of line 163 through the closed mill eliminating switches 44, there being provided one switch for each solenoid. The carriage switch bar 78 is arranged to hold these switches normally in open position, each switch of the series constituting a single pole switch with the exception of the last to the right indicated at 44a, which is double throw. The number of these switches in closed position is determined by the position of the carriage.

In order to simplify the circuit there has been omitted a number of segment switches and associated parts; also since the control system is shown at the start of the cycle the position of the carriage switch bar 78 does not correspond to that in Figures 12 to 14. Assuming that the double throw switch 44a on the right is closed, as indicated in broken lines, and the balance of them open as shown, an electrical circuit will be completed through the closed segment switch and serially through the type hammer solenoids to the right of the closed segment switch but will shunt the last solenoid to the right since the double throw switch 44a is in closed position.

Assuming that only one segment is shifted from zero, the circuit will be completed through the type hammer switch 160, line 162, through the closed segment switch 43 and through the solenoid which is connected to it. The remaining solenoids to the right will then be energized in series even though their segments are in the zero position with the segment switches open. By this arrangement the circuit is completed to all of the solenoids to the right of a given closed segment switch while the solenoids to the left of the closed switch are deenergized by their open switches.

The segments to the right of the last selected decimal place are rendered unoperative by the carriage mill switches 44 whether their segment switches 43 are closed or open since this portion of the circuit is shunted by the closed mill switches to the right of the carriage switch bar 78. It will be apparent therefore, that with the exception of the manual selection of the decimal place the segment and mill switches cooperate automatically in accordance with the carriage position (Figure 12) to print only the desired figures without attention from the operator.

In the circuit disclosed, it will be noted that the type hammer solenoids are energized either in series or in parallel with one another. In other words when the segment switches are closed, the solenoids are energized in parallel from line 162 but when the segment switches are open the solenoids for the zero segments within the active group are energized in series. By way of example, in printing the result "$10.00" the segment carrying the figure "1" will close its switch and thus complete the circuit from the switch in series through the type hammer solenoids for the three zero segments and will be completed by the closed mill switch following the third zero.

In order to overcome the resistance developed by the several type hammer solenoids in series as in the above example, the resistance of the individual windings are sufficiently low to provide sufficient striking force for all of them collectively. On the other hand, when the individual windings are engergized in parallel by closed segment switches the individual low resistance windings are overloaded but no damage results since they are energized only for a moment when the lobe of the type hammer cam passes the actuating plunger of switch 160.

It will be observed that type hammer operation is timed by the type hammer cam to impinge upon the type segments at the dead center dwell position of the crank disk. Immediately after printing, the carriage roll begins to feed the slip outwardly until the next line is indexed in front of the carriage. At this point the carriage rack lift cam closes its switch 164 to energize the rack lift solenoid and thereby hold the roller stationary until the end of the cycle. Although the roller is stationary, rotation of the crank disk continues until it reaches its dead center position at the end of the cycle. At the end of the cycle the rack lift solenoid switch 164 again is opened so as to engage the rack teeth and reestablish the driving connection with the carriage roll. Approximately at the same time, the carriage roll lift cam opens its switch 157 to lower the roller and release the sheet.

After the carriage rack and feed roll solenoids are deenergized, the cycle of operation continues until the segment uncoupling cam closes its switch 165 to energize the segment uncoupling solenoid. This moves the shifter lever 114 (Figure 4) from the left back to the right, in other words, from the position shown in Figure 5 to the position shown in Figure 4. At this point it will be noted that the coupling solenoid 116 previously was energized momentarily upon operation of the cancelling lever and that upon release of the lever the solenoid was deenergized, with the shifter bar 114 held in coupling position by the detent 122.

an attachment adapted to be installed upon the chine having rotatable result gears arranged to indicate the result of a calculation, and having a support surface, said attachment having a housing adapted to be secured to a calculating machine, the housing having a printing section extending transversely a substantial distance beyond the calculating machine, a plurality of rotatable printing elements mounted within the said printing section, a series of rotary shafts extending transversely from the calculating machine to said printing section, each of said shafts mechanically connecting one of said printing elements respectively with a corresponding result gear and adapted to rotate the printing elements in response to the rotation of the result gears, the printing elements having downwardly facing type arranged to print figures corresponding to the result indicated by the result gears, the said type being presented downwardly substantially in plane with the support surface, a pair of feed rollers adapted to meet substantially in the plane of said support surface and thereby to grip a record sheet disposed thereon, means for rotating the said rollers to feed the record sheet into printing position with respect to the printing elements, and printing devices disposed below the printing elements adapted to impress upon the record sheet the type figures of the printing elements when the record sheet is fed to printing position.

4. In an attachment adapted to be installed upon a calculating machine and arranged to print upon a record sheet the result of a calculation performed by the calculating machine, the calculating machine having rotatable result gears arranged to indicate the result of a calculation, and having a support surface, a housing adapted to be secured to a calculating machine, the housing having a printing section extending transversely a substantial distance beyond the side of the calculating machine and above the support surface, a plurality of rotatable printing elements mounted within the said printing section, a series of rotary shafts extending transversely from the calculating machine to said printing section, each of said shafts mechanically connecting one of said printing elements respectively with a corresponding result gear, and adapted to rotate the printing elements in response to the rotation of the result wheels, the printing elements having downwardly facing type arranged to print figures corresponding to the result indicated by the result gears, the said type being presented downwardly substantially in plane with the support surface, an upper and lower feed roller mounted respectively upon the printing section and support surface adapted to meet substantially in the plane of said surface and thereby to grip a record sheet disposed thereon, the said support surface having an opening to accommodate the rollers, the said upper and lower rollers being arranged to form an open throat to accommodate the edge of a record sheet extending laterally beyond the end of the printing section, and means for rotating the said rollers to feed the record sheet into printing position with respect to the printing members.

5. An attachment adapted to be installed upon a calculating machine for printing automatically the result upon the record sheet of a calculation performed upon a calculating machine, said calculating machine having result gears for indicating the result, said attachment comprising, a plurality of shiftable type elements, mechanical means connecting the type elements to the result gears of the calculating machine, the type elements having a face adapted to print numerals corresponding to the result indicated by the result gears, a carriage adapted to feed the record sheet with respect to the said type elements, an electric motor for driving said carriage, electric power means for impinging the record sheet against the type elements to impress the result upon the sheet; and an electrical control system interconnected with the calculating machine and constructed and arranged upon completion of the calculating cycle to energize said electric motor and thereby actuate the carriage and cause the same to feed the sheet to printing position, the control system being adapted to energize the electrical power means for impressing the sheet against the type upon feeding of the sheet to printing position, the carriage being adapted to feed the sheet in retracting direction by continued energization of the electric motor after the energization of the electric power means of the type elements, the control system having a switch adapted to deenergize the motor after the sheet is fed in retracting direction.

6. In an attachment adapted to be installed upon a calculating machine for printing automatically upon a record sheet the results indicated by the calculating machine, said calculating machine having a plurality of rotatable result gears, said attachment comprising a plurality of swinging printing sectors, the said sectors being interconnected mechanically with the result gears and having printing surfaces adapted to print the result indicated by the result gears upon swinging in response to rotation of the result gears, a pair of feed rollers horizontally spaced from the printing sectors and adapted to feed a record sheet to a printing position with respect to the sectors, means for providing a stepwise advancement of the record sheet into printing position constituting a sheet feeding mechanism constructed and arranged to rotate the said rollers in a direction to advance the sheet toward the printing sectors to a printing position, the said sheet feeding mechanism being arranged to rotate the rollers in an opposite direction for retracting the sheet, an electric motor, connecting means extending from the electric motor to said sheet feeding mechanism, and an electrically operated device adapted to uncouple said connecting means during the rotation of the rollers in sheet retracting direction, whereby the sheet is retracted a distance less than the advancement thereof causing the record sheet to be advanced in stepwise progression with respect to the printing sectors.

7. In an attachment adapted to be installed upon a calculating machine for printing automatically upon a record sheet the result indicated by the calculating machine, said machine having result gears to indicate the result, said attachment comprising a plurality of pivotally mounted printing sectors, said printing sectors being disposed laterally in a position remote from the calculating machine, individual rotary shafts extending laterally from the calculating machine and connecting the printing sectors to the result gears to swing the same to positions to print the result indicated by the result gears, feed rollers adapted to advance a record sheet into printing position relative to the printing sectors and to retract the same for a distance less than the advancement thereof to provide a stepwise advancement of the sheet with respect to the printing segments, a pinion adapted to rotate said feed rollers, a rack engaging said pinion, a crank constructed and arranged to reciprocate the rack and thereby to rotate the feed rollers in forward and reverse directions, an electric motor in driving connection with said crank, an electrical control system interconnected with the calculating machine adapted to energize said electric motor when the result gears are rotated from a result indicating to a zero position, a switch electrically interconnected in the control system and mechanically connected to said motor and adapted to deenergize the motor when the crank has completed a reciprocation of the rack, an electrically operated uncoupling device mechanically connected to the rack and electrically interconnected in the control system, the uncoupling device being constructed and arranged to disengage the rack from the pinion during retraction of the sheet thereby to provide the stepwise advancement thereof, and timing means for actuating the said uncoupling device in time with the rotation of said crank.

8. In an attachment adapted to be installed upon a calculating machine for printing automatically upon a record sheet the results indicated by the plurality of rotatable result gears of the calculating machine, the attachment having a plurality of swinging printing sectors, the said sectors being mechanically interconnected with the result gears and having printing surfaces adapted to print the result indicated by the result gears upon swinging in response to rotation of the result gears, a pair of feed rollers normally disposed in spaced relationship with one another, the said rollers being disposed adjacent the printing sectors and adapted to feed a record sheet to a printing position with respect to the sectors, electric power means connected to one of said feed rollers adapted to move the same into engagement with the other roller to grip a record sheet placed therebetween, a second electric power means connected to one of said rollers and arranged to rotate the said roller in a direction to advance the sheet to a printing position, the second electric power means being constructed and arranged to rotate the rollers in an opposite direction for retracting the sheet a distance less than the advancement thereof and thereby to advance the record sheet in stepwise progression with respect to the printing sectors, a plurality of printing hammers arranged to impinge against the printing surfaces with the record sheet interposed between the hammers and printing surfaces, a third electric power means connected to the printing hammers and adapted to actuate the same, and an electrical control system constructed and arranged sequentially to energize the first, second and third power means.

9. In an attachment adapted to be installed upon a calculating machine adapted to print upon a record sheet the results calculated by a calculating machine having result gears, the attachment having a plurality of printing sectors mechanically interconnected with the result gears and constructed and arranged to print the result indicated by the result gears, a carriage including a pair of feed rollers adapted to grip and shift the record sheet transversely into alignment with the printing sectors, an electrically operated power device for shifting the said carriage transversely and spring means biasing the said electrically operated device and arranged to shift the carriage in the opposite direction when the electrically operated power device is deenergized, a plurality of electrically operated carriage stops arranged to maintain the carriage in predetermined transverse positions with respect to the printing sectors and thereby to align the record sheet therewith, a plurality of manually operated selector switches interconnected electrically with the carriage stops for actuating the same, an electrically driven timer, a switch mechanically connected to the calculating machine and electrically connected to the timer to energize the same, a switch in driving connection with the timer and electrically connected to the electrically operated power device and adapted to shift the carriage in advance of the operation of the said carriage stops, a second switch in driving connection with the timer and electrically connected to the electrically operated carriage stops, said second switch being adapted to maintain the stops in operating position after the said electrical device is deenergized and thereby to maintain the carriage in transverse index position against the force exerted upon the carriage by the said spring member.

10. In combination with a calculating machine having a series of result dials bearing figures to indicate visually the result of a calculation, an attachment adapted to be installed upon the calculating machine to operate in conjunction with the machine to print automatically upon a record sheet the result of a calculation, said attachment comprising a plurality of shiftable type bearing elements, each type bearing element having type figures corresponding to the figures carried by the result dials, mechanical means connecting the type elements to the result dials individually, said mechanical means being adapted to shift the type bearing elements respectively to positions to print figures corresponding to the result displayed by the result dials, a respective printing device arranged to cooperate with each of said type elements adapted upon being energized to impress said type figures upon the record sheet, electrically operated power means connected to the respective printing devices adapted to actuate the same individually, sheet feeding means adapted to advance the record sheet to a printing position relative to the type bearing elements, an electric motor connected to said sheet feeding means for driving the same, a cycle starting switch interconnected mechanically with the calculating machine and adapted to energize the electric motor upon completion of a calculation, a circuit holding switch operatively connected to said motor and adapted to energize the motor for one cycle of operation after the cycle starting switch is closed, and a second switch operatively connected to said motor adapted to energize the electrically operated power means of the printing devices to impress the result upon the record sheet upon advancement of the record sheet by said sheet feeding means to said printing position during the cycle of motor operation.

11. In combination with a calculating machine having a series of result dials bearing figures to indicate visually the result of a calculation, an attachment adapted to be installed upon the calculating machine to operate in conjunction with the machine to print automatically upon a record sheet the result of a calculation, said attachment comprising a plurality of shiftable type bearing elements, each type bearing element having type figures corresponding to the figures carried by the result dials, mechanical means connecting the type elements to the result dials individually, said mechanical means being adapted to shift the type bearing elements respectively to positions to print figures corresponding to the result displayed by the result dials, a respective printing device arranged to cooperate with each of said type elements to impress said type figures upon the record sheet, electrically operated power means connected to the respective printing devices and adapted to actuate the same individually, sheet feeding means adapted to advance the record sheet to a printing position relative to the type bearing elements, an electrical motor connected to said sheet feeding means for driving the same, a cycle starting switch mechanically interconnected with the calculating machine and electrically connected to the motor and adapted to energize the motor upon completion of a calculation, a switch tripping shaft mechanically connected to the electric motor and adapted to be rotated through one revolution to provide a cycle of operation when the cycle switch is closed, a circuit holding switch operatively connected to said shaft electrically connected to the motor to maintain the motor energized for one cycle of shaft rotation after the cycle starting switch is closed, and a second switch operatively connected to said shaft adapted to be tripped upon rotation thereof and thereby to energize the electrically operated power means of the printing devices to impress the result upon the record sheet upon advancement of the record sheet by said sheet feeding means to printing position during the cycle of motor operation.

12. An attachment adapted to be installed upon a calculating machine for printing automatically upon a record sheet the result of a calculation performed upon the calculating machine, said calculating machine having rotatable result wheels adapted to indicate visually the result of a calculation, said attachment comprising a plurality of shiftable type elements, mechanical means connecting the type elements to the result wheels of the calculating machine, the type elements each having a type face bearing figures and adapted to print upon the record sheet the result indicated by the result wheels, a carriage having rotatable rollers adapted to feed the record sheet with respect to said type elements, an electric motor in driving connection with said rollers, electrical printing means adapted to impinge the record sheet against the type elements to print upon the sheet the result displayed by the type elements, a cycle starting switch mechanically interconnected with the calculating machine and adapted to be closed upon completion of a calculating operation, said switch being electrically connected to the electric motor for energizing the same, a cycle control switch in driving connection with the motor adapted to maintain the motor in energized condition for a single cycle of operation after the same is energized by the cycle starting switch, said electric motor being adapted to rotate the carriage rollers in forward and reverse directions during the cycle to cause the same to advance the sheet to printing position then retract the same during the cycle, a second switch in driving connection with the electric motor and in electrical connection with the electrical printing means, said second switch being adapted to be closed during the cycle to energize the electrical printing means when said carriage rollers have advanced the sheet to printing position, the cycle control switch being adapted to deenergize the electric motor after the carriage rollers have been rotated by the electric motor in reverse direction to retract the printed record sheet.

13. An attachment adapted to be installed upon a calculating machine for printing automatically upon a record sheet the result of a calculation performed upon the calculating machine, said calculating machine having rotatable result wheels adapted to indicate visually the result of a calculation, said attachment comprising a plurality of shiftable type elements, mechanical means connecting the type elements to the result wheels of the calculating machine, the type elements each having a type face bearing figures and adapted to print upon the record sheet the result indicated by the result wheels, a pair of normally spaced parallel feed rollers adjacent the type elements adapted to engage and feed the record sheet with respect to said type elements, an electric motor in driving connection with one of said rollers for rotating the same, an electric roller shifting device connected to one of said rollers and adapted to shift the same into pressure engagement with the other of said rollers and thereby engage the record sheet therebetween, electrical printing members in operative relationship with the type elements adapted to impress the record sheet against the type elements, a cycle starting switch mechanically interconnected with the calculating machine and adapted to be closed upon completion of a calculating operation, the switch being electrically connected to said electric motor and adapted to energize the same upon completion of a calculating operation, a cycle control switch connected to the electric motor and adapted to maintain the motor in energized condition for a single cycle of operation after the same is energized by the cycle starting switch, said electric motor being adapted to rotate the feed roller in forward and reverse directions during the cycle to cause the same to advance the sheet to printing position then retract the same during the cycle of operation, a switch in driving connection with the motor and electrically connected to the roller shifting device adapted to be closed at the start of the cycle and thereby shift the roller to sheet engaging position, a printing switch in driving connection with the motor and in electrical connection with the printing members adapted to energize the electrical printing members when said roller has fed the sheet to printing position, the cycle control switch being adapted to deenergize the electric motor after the roller has been rotated by the electric motor in reverse direction to retract the printed record sheet.

CARLOS WITTENMYER.

References Cited in the file of this patent

UNITED STATES PATENTS

| Number | Name | Date |
|---|---|---|
| 1,317,454 | Penney | Sept. 30, 1919 |
| 1,724,615 | Powers | Aug. 13, 1929 |
| 1,938,907 | Hosack | Dec. 12, 1933 |
| 1,994,211 | Crosman | Mar. 12, 1935 |
| 2,021,618 | Sundstrand | Nov. 19, 1935 |
| 2,038,717 | Christian | Apr. 28, 1936 |
| 2,059,251 | Lasker | Nov. 3, 1936 |
| 2,139,131 | Muller | Dec. 6, 1938 |
| 2,141,332 | Arnold | Dec. 27, 1938 |
| 2,229,763 | Muller | Jan. 28, 1941 |
| 2,238,517 | Colley et al. | Apr. 15, 1941 |
| 2,357,167 | Broido | Aug. 29, 1944 |
| 2,441,870 | Christian | May 18, 1948 |